United States Patent [19]

Uchikawa

[11] Patent Number: 5,728,932
[45] Date of Patent: Mar. 17, 1998

[54] METHOD FOR DIAGNOSING PERFORMANCE OF INTAKE AIR AMOUNT DETECTION DEVICE AND APPARATUS THEREOF

[75] Inventor: Akira Uchikawa, Atsugi, Japan

[73] Assignee: Unisia Jecs Corporation, Kanagawa-ken, Japan

[21] Appl. No.: 761,090

[22] Filed: Dec. 5, 1996

[30] Foreign Application Priority Data

Dec. 8, 1995 [JP] Japan .................. 7-320900

[51] Int. Cl.$^6$ .................. G01M 15/00; F02D 45/00
[52] U.S. Cl. .................. 73/118.2; 340/439; 364/431.03
[58] Field of Search .................. 73/116, 117.2, 73/117.3, 118.1, 118.2; 340/438, 439; 364/431.03, 431.04

[56] References Cited

U.S. PATENT DOCUMENTS

| | | | |
|---|---|---|---|
| 4,750,352 | 6/1988 | Kolhoff | 73/117.3 |
| 4,976,139 | 12/1990 | Miyama et al. | 73/117.3 |
| 5,018,383 | 5/1991 | Togai et al. | 73/118.1 |
| 5,127,263 | 7/1992 | Iizuka | 73/118.1 |
| 5,138,873 | 8/1992 | Amano | 73/118.1 |
| 5,249,459 | 10/1993 | Becker | 73/118.1 |
| 5,408,871 | 4/1995 | Lieder et al. | 73/118.2 |
| 5,465,617 | 11/1995 | Dudek et al. | 73/118.2 |
| 5,522,363 | 6/1996 | Gotoh | 73/118.1 |
| 5,542,292 | 8/1996 | Schneider et al. | 73/118.1 |
| 5,597,951 | 1/1997 | Yoshizaki et al. | 73/118.2 |

Primary Examiner—George M. Dombroske
Attorney, Agent, or Firm—Lowe, Price, LeBlanc & Becker

[57] ABSTRACT

Technology for diagnosing an intake air amount detection device of an internal combustion engine, wherein an operation region in which the engine is stably operating is determined, the opening degree of a throttle valve interposed in an intake system of the engine is detected, a change in the opening degree of the throttle valve is calculated when the opening degree of the throttle valve is changed in the determined stable operation region, and an intake air change amount detected by the intake air amount detection device is calculated when the opening degree of the throttle valve is changed in order to diagnose performance of the intake air amount detection device based on a relationship between the change in the opening degree of the throttle valve and the intake air change amount.

21 Claims, 7 Drawing Sheets

METHOD FOR DIAGNOSING PERFORMANCE OF INTAKE AIR AMOUNT DETECTION DEVICE AND APPARATUS THEREOF

BACKGROUND OF THE INVENTION

1. Field of the Invention

The present invention relates to a method for diagnosing performance of a device for detecting quantities such as flow rate or pressure of intake air of an internal combustion engine and to an apparatus thereof.

2. Related Art of the Invention

In an internal combustion engine equipped with an electronically controlled fuel injection device, it is accepted practice to detect the flow rate or pressure of the intake air and to control the fuel injection amount in proportion to the intake air amount of the cylinders, thereby controlling the air-fuel ratio to accomplish a target value.

In such a control operation, in case an air flow meter or a pressure sensor for detecting the flow rate or pressure of the intake air becomes defective, it no longer becomes possible to properly control the fuel injection amount and also the air-fuel ratio. Therefore, attempts have been made to diagnose the defect.

So far, however, diagnosis has been limited to detecting fatal defects such as breakage of the wire, short-circuiting, etc. that causes the device to be no longer usable, or detecting an obvious abnormality by comparing the output values with the determination levels in such extreme regions as when the engine is idling or when the throttle valve is fully opened. Drop of performance due to aging has not been taken into the item of diagnosis.

Therefore, no countermeasure has been taken to cope with the drop of performance for controlling the air-fuel ratio caused by degradation in the performance of the air flow meter and the pressure sensor.

SUMMARY OF THE INVENTION

The present invention was accomplished in view of the above-mentioned problems, and its object is to provide a diagnosis method capable of diagnosing even a drop in the performance of an intake air amount detection device and an apparatus thereof.

In order to accomplish the above-mentioned object, a method or apparatus for diagnosing an intake air amount detection device of an internal combustion engine of the present invention comprises:

determining an operation region in which an internal combustion engine equipped with an intake air amount detection device stably operates by an operation region determination means;

detecting the opening degree of a throttle valve interposed in an intake system of the engine by a throttle valve opening degree detecting means;

calculating a change amount of the throttle valve opening degree when the opening degree of the throttle valve is changed in the determined stable operation region by using a means for calculating a change amount of the throttle valve opening degree;

calculating an intake air change amount detected by the intake air amount detection device when the opening degree of the throttle valve is changed by a means for caluclating an intake air change amount; and diagnosing, by a diagnosing means, performance of the intake air amount detection device based upon a relationship between the change in the opening degree of the throttle valve and the change in the intake air amount.

According to the thus constituted method or apparatus, the following effects are obtained.

In the regions where the engine loses stability, the intake air amount may change due to factors other than a change in the opening degree of the throttle valve. In such operation regions, the intake air amount may be diagnosed relying upon a change in the opening degree of the throttle valve. Therefore, a stable region can be selected in which, if the opening degree of the throttle valve is change, the intake air amount changes in good response to the change in the opening degree of the throttle valve.

When the performance of the intake air amount detection device has not been deteriorated in the above-mentioned stable operation region, therefore, a predetermined relationship is maintained between the change amount of the opening degree of the throttle valve and the intake air change amount. When the performance has been deteriorated, the predetermined relation is no longer maintained. By comparing the calculated results of the change amounts, therefore, performance of the intake air amount detection device can be diagnosed.

In the above-mentioned method or apparatus, furthermore, the warmed-up state of the engine or the non-misfiring state of the engine may be included as conditions for the stable operation region in determining the region of stable operation.

It is then allowed to determine the region of stable operation where the combustion takes place stably.

In the above-mentioned method or apparatus, furthermore, a partial-throttle output state of the engine may be included as a condition for the stable operation region in determining the region of stable operation.

Then, the intake air amount in the saturated state does not almost change even though the opening degree of the throttle valve that is nearly fully opened may have changed to some extent; i.e., the full-throttle state is excluded from the condition for the stable operation region to maintain precision of diagnosis.

In the above-mentioned method or apparatus, furthermore, the density of the open air may be detected, and the intake air change amount may be calculated by correcting the intake air change amount relying upon the detected air density.

Then, the volume flow rate of the air favorably changes corresponding to a change in the opening degree of the throttle valve. When the intake air amount detection device is the one that detects the mass flow rate of the air, therefore, the diagnosis of a high precision can be maintained by correcting the intake air change amount relying upon the air density.

The method or apparatus for diagnosing an intake air amount detection device of an internal combustion engine according to another aspect comprises:

determining a plurality of predetermined operation regions of an internal combustion engine equipped with an intake air amount detection device by a predetermined operation region determination means;

calculating deviations among the respective intake air amounts detected by the intake air amount detection device in the plurality of determined predetermined operation regions by a deviation calculation means; and comparing the calculated deviations with a reference value to diagnose (by a diagnosing means) performance of the intake air amount detection device.

According to the thus constituted method or apparatus, performance of the intake air amount detection device can be diagnosed relying upon whether the respective intake air amounts in the plurality of predetermined operation regions have deviations depending upon the regions.

According to the method or apparatus of the another aspect, furthermore, the intake air amount detection device may be an air flow meter for detecting the flow rate of the intake air.

Then, it is made possible to diagnose performance of the air flow meter which is an intake air amount detection device.

According to the method or apparatus of the another aspect, furthermore, the intake air amount detection device may be a pressure sensor for detecting the pressure of the intake air.

This makes it possible to diagnose performance of the pressure sensor which is an intake air amount detection device.

EMBODIMENTS

An embodiment of the present invention will now be described with reference to the drawings.

Figure 1:
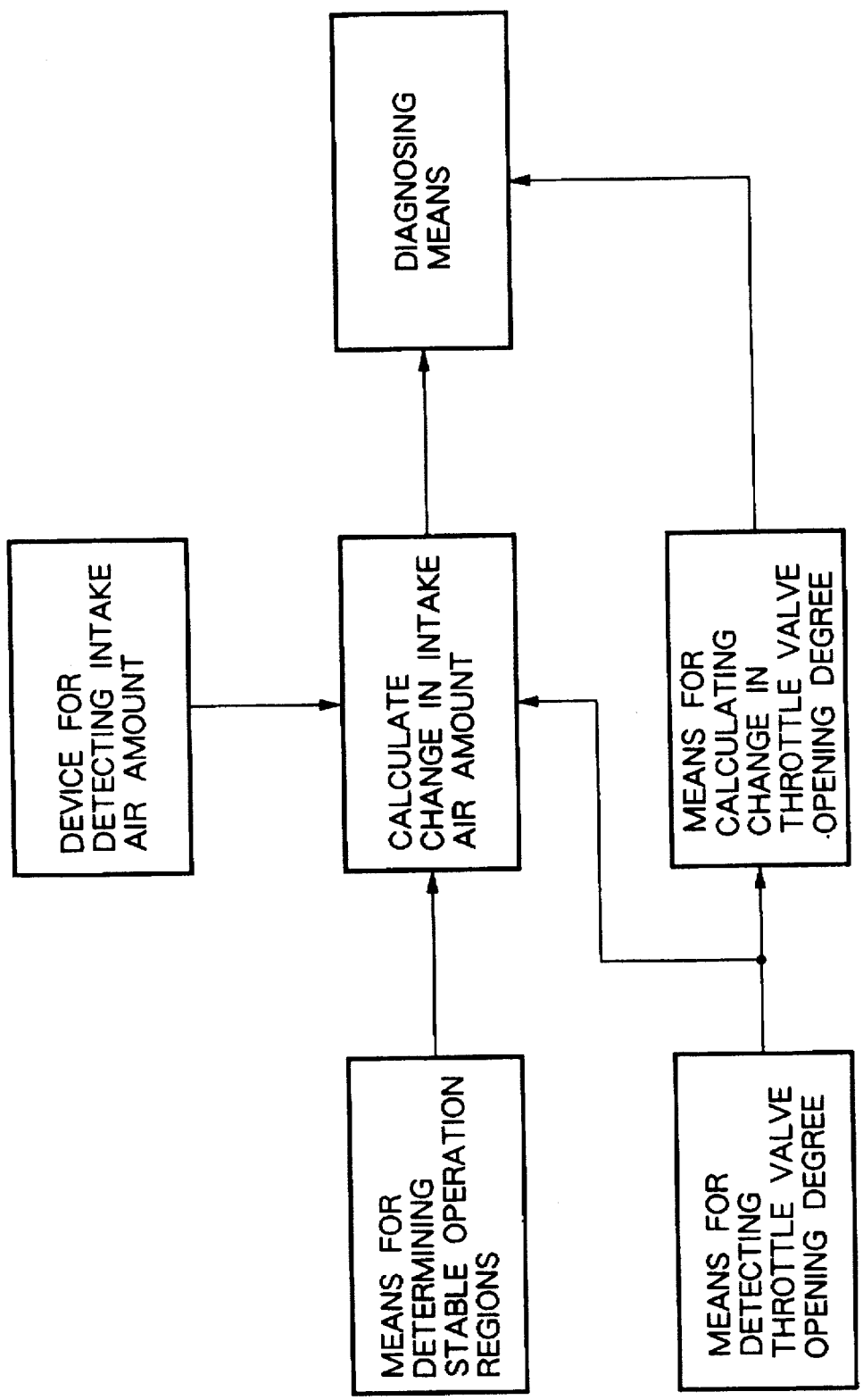
FIGS. 1 and 2 are block diagrams illustrating the constitution and function of the present invention (first aspect and second aspect)
Figure 2:
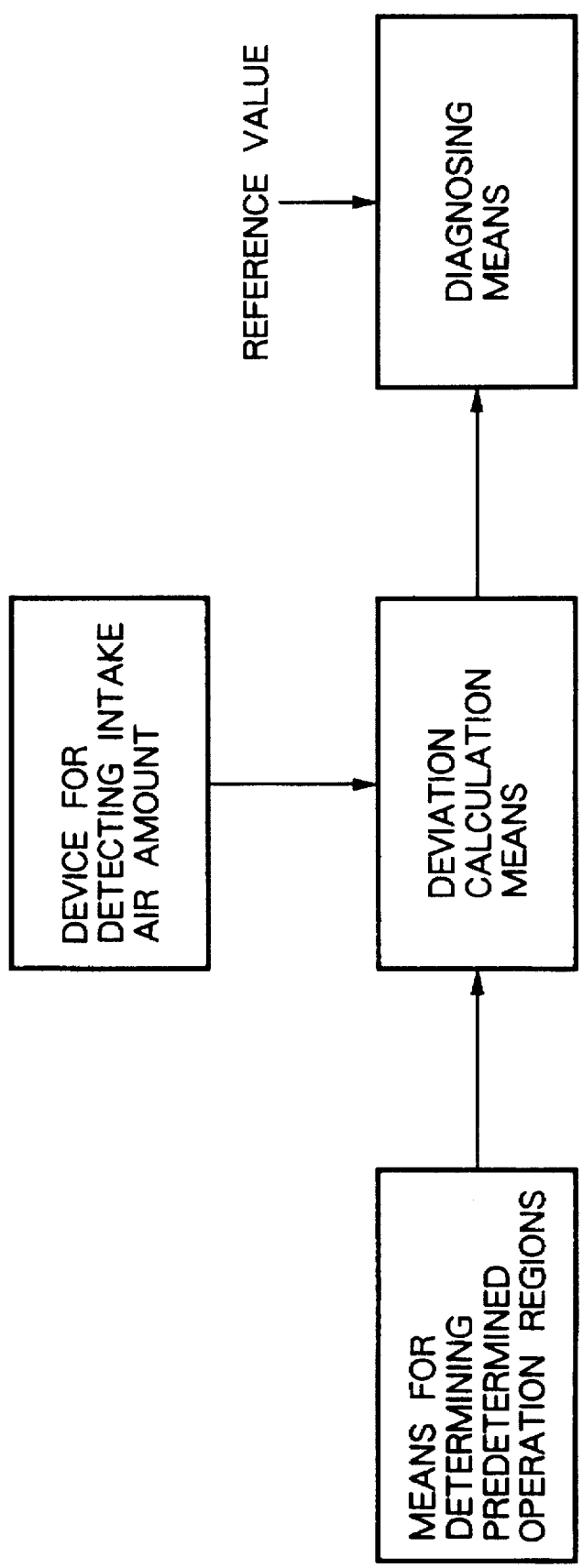
Figure 3:
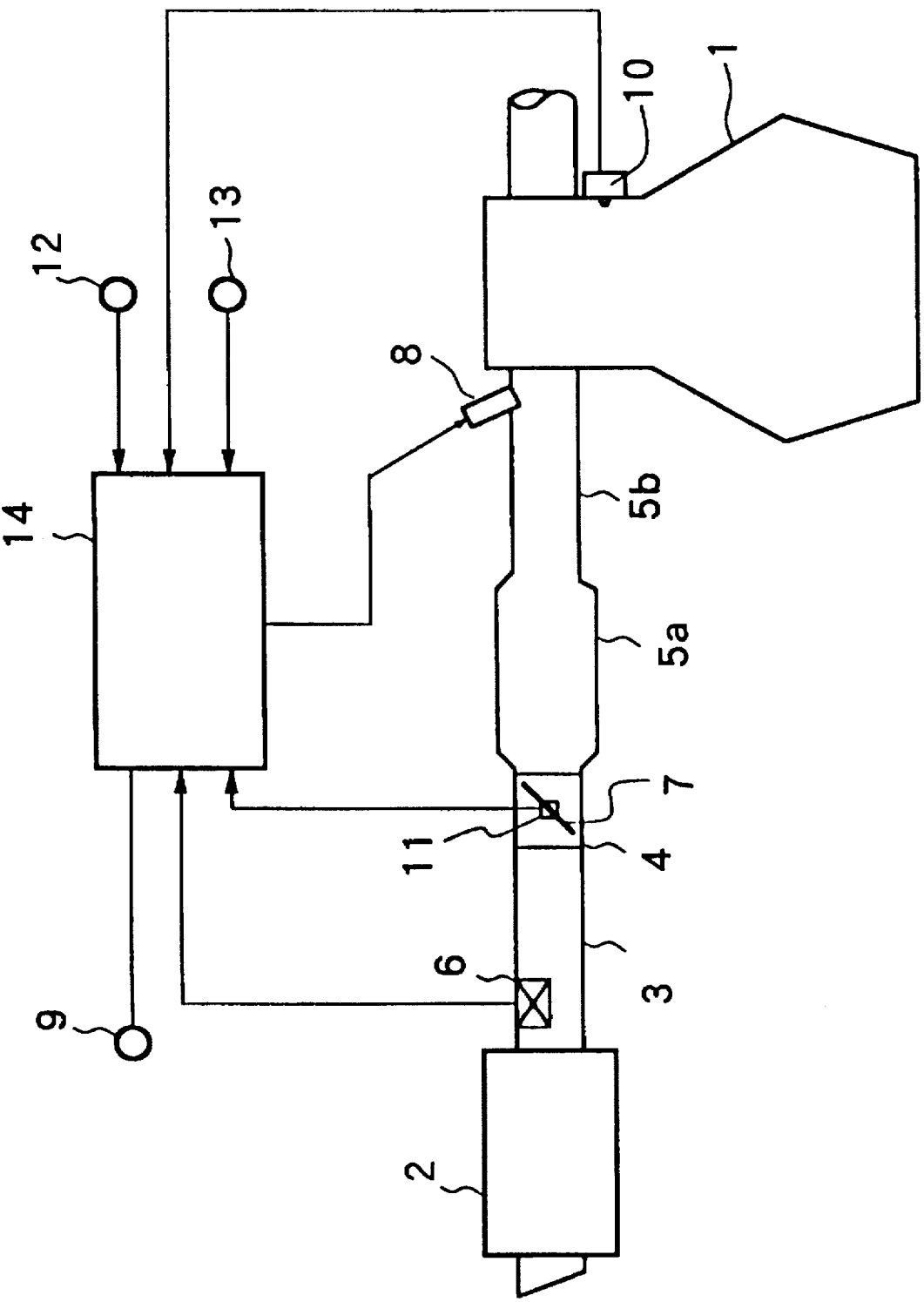
FIG. 3 is a diagram illustrating the constitution of a system according to a first embodiment of the present invention.

Referring to FIG. 3 illustrating an internal combustion engine equipped with an intake air amount detection device according to the embodiment and a control system therefor, the internal combustion engine intakes air through an air cleaner 2, an intake duct 3, a throttle chamber 4 and an intake manifold 5.

The intake duct 3 is provided with an air flow meter 6 of the type of hot wire or of the like type which detects the intake air amount Q as a mass flow rate. The throttle chamber 4 is provided with a throttle valve 7 which operates being interlocked to an accelerator pedal that is not shown, and controls the intake air amount Q.

The intake manifold 5 comprises a collector portion 5a on the downstream side of the throttle valve 7 and branched portions 5b branched for each of the cylinders further on the downstream side thereof. Each branched portion 5b has an electromagnetic fuel injection valve 8 working as a fuel injection means and injecting the fuel supplied from a fuel injection pump that is not shown and controlled at a predetermined pressure by a pressure regulator.

Furthermore, provision is made of a crank angle sensor 9 which outputs a reference signal for each predetermined crank angle corresponding to a specific stroke in each cylinder and outputs a unit crank angle signal for each unit crank angle (e.g., 1° or 2°), a water temperature sensor 10 for detecting the temperature of the cooling water of the engine, a throttle sensor 11 for detecting the opening degree of the throttle valve 7, and atmospheric pressure sensor 12 for detecting the atmospheric pressure, and an intake air temperature sensor 13 for detecting the intake air temperature. The detection signals from these sensors are input to a control unit 14 in a microcomputer.

The control unit 14 detects the rotational speed N of the engine by measuring a period of the reference signal from the crank angle sensor 9 or measuring the number of times of the unit crank angle signals within a fixed period of time, and controls the fuel injection and the ignition depending upon the operation condition of the engine found based upon other detection signals and further diagnoses performance of the air flow meter 6 which is an intake air amount detection device in a manner as described below.

Figure 4:
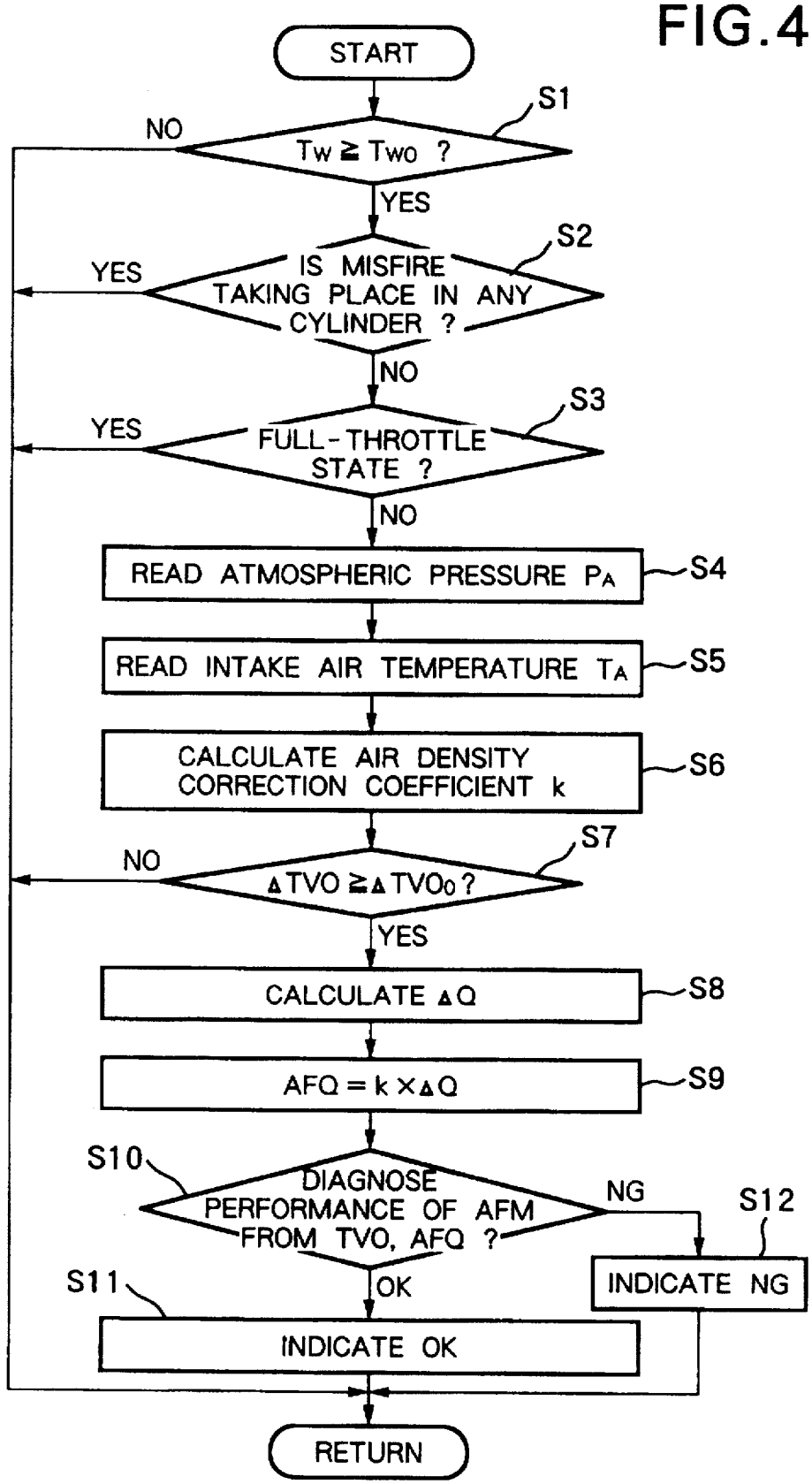
FIG. 4 is a flow chart illustrating a routine for diagnosing the performance of an air flow meter according to the first embodiment.

FIG. 4 is a flow chart of a routine for diagnosing performance of the air flow meter according to the first embodiment.

At step 1 (abbreviated as S in the drawings, the same holds hereinafter), it is determined whether the cooling water temperature Tw of the engine detected by the water temperature sensor 10 is equal to or higher than a predetermined temperature TwO and the engine has been warmed up or not.

When it is determined that the water temperature Tw is equal to or higher than the predetermined temperature TwO and the engine has been warmed up, the routine proceeds to step 2 where it is determined whether misfire is taking place in any cylinder or not. Concretely speaking, the occurrence of misfire is determined relying upon a change in the rotation of the engine or a change in the pressure in the cylinder.

When it is determined at step 2 that no misfire is taking place, i.e., when it is determined that the engine has been warmed up and is in a stable operation region where no misfire is occurring, the routine proceeds to step 3 where it is determined whether the engine is in the full-throttle state or not.

When it is determined at step 3 that the engine is not in the full-throttle state, the routine proceeds to step 4 and the subsequent steps to diagnose performance of the air flow meter. The full-throttle state of the engine is excluded from the conditions for executing the diagnosis. This is because, even when the opening degree of the throttle valve is changed to some extent under the full-throttle state, the intake air amount is in a saturated state and changes very little. By excluding the full-throttle state from the conditions of the stable operation region, therefore, the precision of diagnosis is maintained.

At step 4, the atmospheric pressure PA detected by the atmospheric pressure sensor 12 is read. The atmospheric pressure may be detected by using the intake air pressure detected or when the engine is not running or when the throttle valve 7 is fully opened instead of being detected by the atmospheric pressure sensor 12.

At step 5, the intake air temperature TA detected by the intake air temperature sensor 13 is read.

At step 6, an air density correction coefficient k is calculated (e.g., retrieved from a map) to correct an intake air change amount $\Delta Q$ corresponding to the density of the atmosphere based upon the detected atmospheric pressure PA and the intake air temperature TA.

At step 7, it is determined whether the opening degree TVO of the throttle valve 7 detected by the throttle sensor 11 is changed by a predetermined amount $\Delta TVO0$ or more.

When it is determined at step 7 that the opening degree TVO is changed by the predetermined amount $\Delta$TVO0 or more, the routine proceeds to step 8 where an intake air change amount $\Delta$Q in the intake air amount Q detected by the air flow meter 6 is calculated before and after a change in the opening degree of the throttle valve 7.

At step 9, the intake air change amount $\Delta$Q is corrected by the air density correction coefficient k calculated at step 7, thereby to calculate a corrected value $\text{A}\text{F}\text{Q}=k\times\Delta Q$. The reason why this correction is carried out is that, although the volume flow rate of the air changes favorably in response to a change in the opening degree of the throttle valve, in this embodiment, since a hot wire type air flow meter is used as the air flow meter 6 and the intake air amount is measured as the mass flow rate, the intake air amount is corrected by the air density and is converted into a change in the volume flow rate of the intake air. This makes it possible to maintain diagnosis at high precision.

Figure 5:
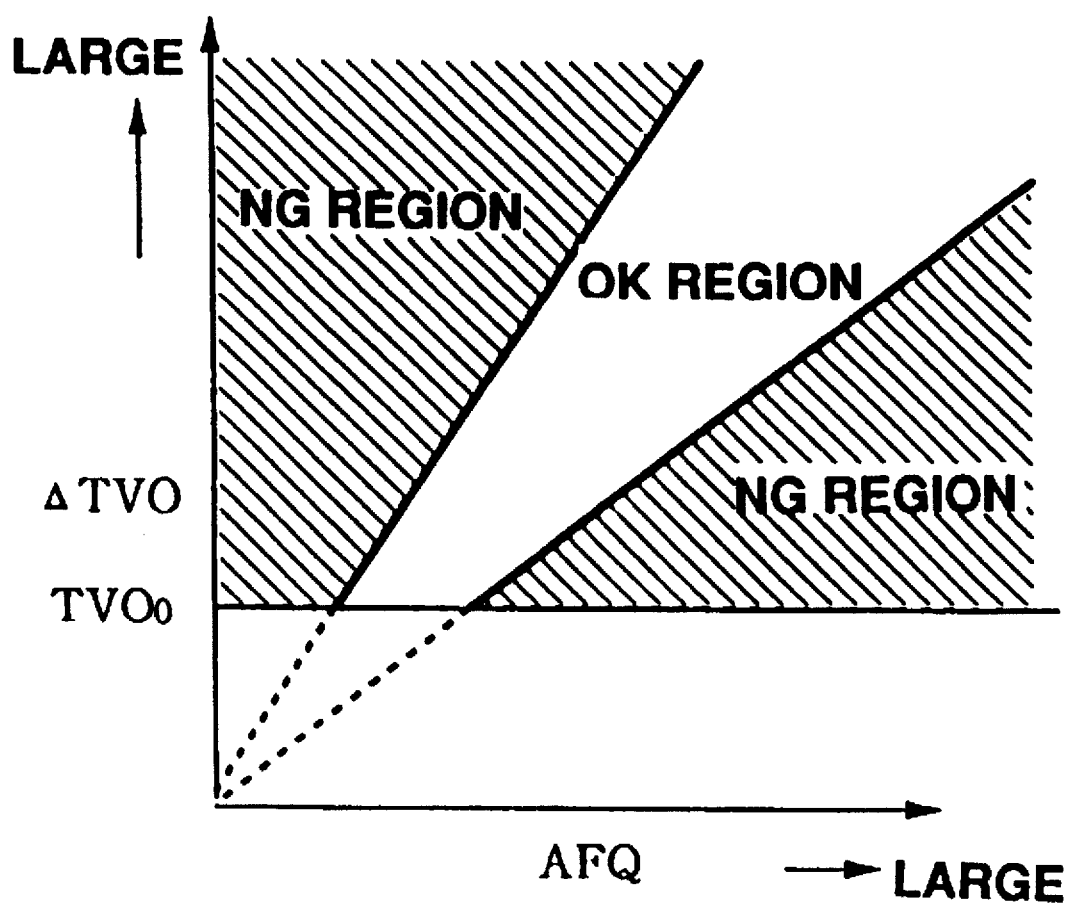
FIG. 5 is a map for diagnosis used in the first embodiment.

At step 10, performance of the air flow meter 6 is diagnosed based upon the calculated change $\Delta$TVO in the opening degree of the throttle valve and the corrected intake air change amount AFQ. By using, for instance, a map shown in FIG. 5, it is determined whether the performance of the air flow meter 6 is good (OK) or is deteriorating (NG). At step 11, a diagnosis result of good is indicated by an LED or the like and at step 12, a diagnosis result of deterioration is indicated in the same manner.

Thus, a drop in the performance can be diagnosed by simply monitoring the values detected by the sensors depending upon the operation condition of the engine other than detecting absolute defects such as breakage of wire or short-circuiting of the air flow meter 6. It is then made possible to determine a drop in the performance for controlling the air-fuel ratio and hence to take a necessary countermeasure.

Figure 6:
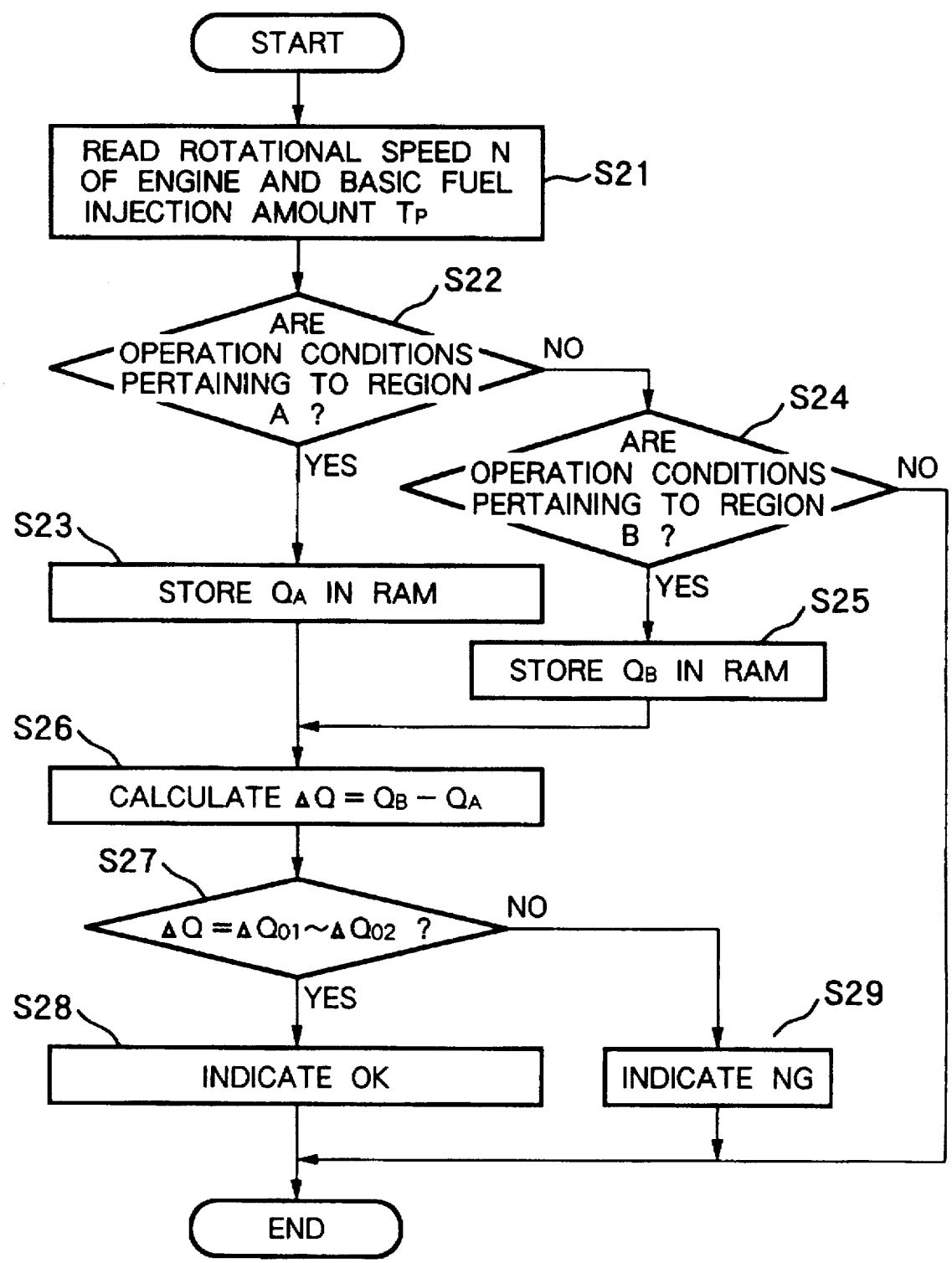
FIG. 6 is a flow chart illustrating a routine for diagnosing the performance of the air flow meter according to a second embodiment.

A routine for diagnosing the performance of the air flow meter according to the second embodiment will now be described according to the flow chart of FIG. 6.

At step 21, the engine rotational speed N detected by the crank angle sensor 9 and a basic fuel injection amount Tp (=K·Q/N; K is a constant) calculated by a separate routine are read.

Figure 7:
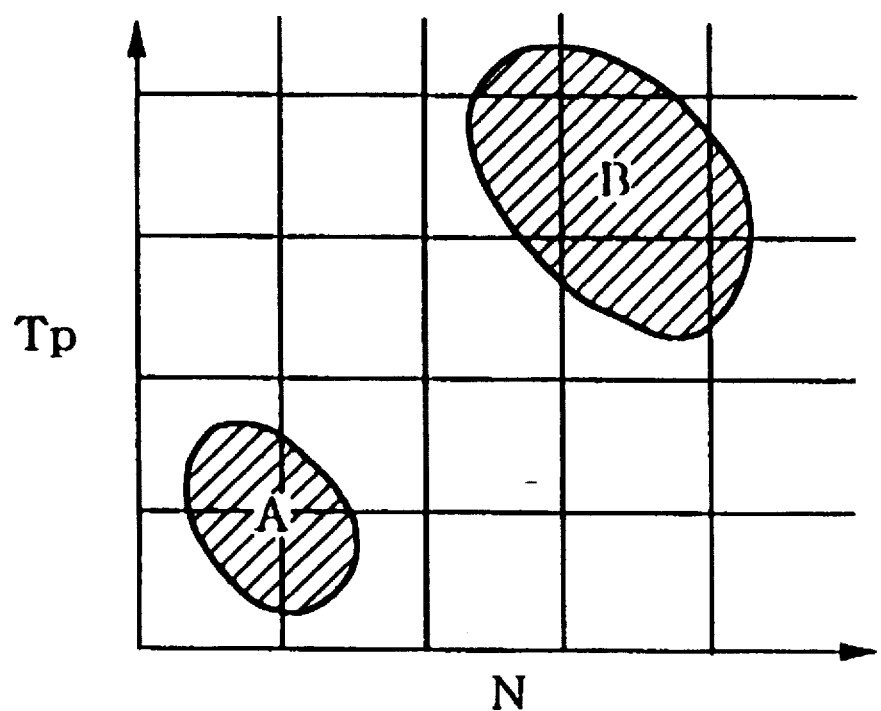
FIG. 7 is a map for determining the region used in the second embodiment.

At step 22, it is determined whether the engine rotational speed N and the basic fuel injection amount Tp are steadily within a predetermined operation region A (e.g., low speed/low load region) or not based upon the retrieval from a map shown in FIG. 7.

When it is determined at step 22 that the above operation conditions are within the operation region A, the routine proceeds to step 23 where the intake air amount QA detected by the air flow meter 6 is stored in the RAM.

When it is determined at step 22 that the operation conditions are outside the operation region A, the routine proceeds to step 24 where it is determined whether the operation conditions pertain to a predetermined operation region (e.g., high speed/high load region) different from the above-mentioned operation region A.

When it is determined that the operation conditions are within the operation region B, the routine proceeds to step 25 where the intake air amount QB detected by the air flow meter 6 is stored in the RAM and, then, the routine proceeds to step 26. When it is determined that the operation conditions are outside the operation region B, either, the routine returns back to step 1.

Step 26 calculates a deviation $\Delta Q=QB-QA$ between the latest intake air amounts QA and QB detected in the two operation regions A and B.

At step 27, it is determined whether the deviation $\Delta Q$ is within a range of reference values $\Delta Q01$ to $\Delta Q02$ of deviations that have been found in advance (or simply, if $\Delta Q$ is equal to or larger than $\Delta Q01$) or not. When the deviation $\Delta Q$ is within this range, the routine proceeds to step 28 where it is so diagnosed that the performance of the air flow meter 6 is good (OK). When the deviation $\Delta Q$ is outside the above range, the routine proceeds to step 29 where it is so diagnosed that the performance of the air flow meter 6 is deteriorating (NG).

Thus, the performance of the air flow meter 6 can be easily diagnosed depending upon whether the respective detected intake air amounts in a plurality of predetermined operation regions have deviations depending upon such regions.

Though the above-mentioned embodiments have diagnosed the air flow meter for detecting the intake air amount as an intake air amount detection device, the present invention can be also adapted even to diagnosing a pressure sensor for detecting the pressure of the intake air on the downstream side of the throttle valve as an intake air amount detection device. In this case, the diagnosis will be effected by calculating a change $\Delta$P in the intake air pressure P and a deviation $\Delta$P in the detected values P among the regions instead of calculating the change $\Delta$Q or the deviation $\Delta$Q.

I claim:

1. A method for diagnosing performance of an intake air amount detection device of an internal combustion engine comprising:

determining an operation region in which the internal combustion engine equipped with an intake air amount detection device stably operates;

detecting the opening degree of a throttle valve interposed in an intake system of said engine;

calculating a change amount of the throttle valve opening degree when the opening degree of the throttle valve is changed in said determined stable operation region;

calculating an intake air change amount detected by said intake air amount detection device when the opening degree of said throttle valve is changed; and diagnosing performance of the intake air amount detection device based upon a relationship between the change amount of the opening degree of said throttle valve and the intake air change amount.

2. A method for diagnosing performance of an intake air amount detection device of an internal combustion engine according to claim 1, wherein, in determining said stable operation region, the warmed-up state of the engine and the state where no misfiring is occurring are included as conditions of the stable operation region.

3. A method for diagnosing performance of an intake air amount detection device of an internal combustion engine according to claim 1, wherein, in determining said stable operation region, the partial-throttle output state of the engine is included as a condition of the stable operation region.

4. A method for diagnosing performance of an intake air amount detection device of an internal combustion engine according to claim 1, wherein the density of the atmosphere is detected, and the intake air change amount is calculated by being corrected by the detected air density.

5. A method for diagnosing performance of an intake air amount detection device of an internal combustion engine according to claim 1, wherein said intake air amount detection device is an air flow meter for detecting the intake air amount.

6. A method for diagnosing performance of an intake air amount detection device of an internal combustion engine according to claim 1, wherein said intake air amount detection device is a pressure sensor for detecting the pressure of the intake air.

7. A method for diagnosing performance of an intake air amount detection device of an internal combustion engine according to claim 1, wherein said operating region in which the internal combustion engine operates stably is a normal operating region of a vehicle including the engine, and said step of calculating a change amount of the throttle valve opening degree is implemented when the opening degree of the throttle valve is changed by a driver of the vehicle including the engine during normal operation of the vehicle.

8. A method for diagnosing performance of an intake air amount detection device of an internal combustion engine according to claim 7, wherein said step of calculating an intake air change amount detected by said intake air amount detection device comprises calculating said intake air change amount corresponding to the calculated change amount of the throttle valve opening degree.

9. A method for diagnosing performance of an intake air amount detection device of an internal combustion engine according to claim 1, wherein said and said step of diagnosing performance of the intake air amount detection device comprises determining whether or not there exists a change amount in the intake air quantity corresponding to the calculated change amount of the throttle valve opening degree.

10. A method for diagnosing performance of intake air amount detection device of an internal combustion engine comprising:

determining a plurality of different predetermined operation regions having different operating characteristics of an internal combustion engine equipped with an intake air amount detection device;

calculating deviations among the respective intake air amounts detected by said intake air amount detection device in said plurality of determined predetermined operation regions; and comparing said calculated deviations with a reference value to diagnose performance of the intake air amount detection device.

11. A method for diagnosing performance of an intake air amount detection device of an internal combustion engine according to claim 10, wherein said intake air amount detection device is an air flow meter for detecting the intake air amount.

12. A method for diagnosing performance of an intake air amount detection device of an internal combustion engine according to claim 10, wherein said intake air amount detection device is a pressure sensor for detecting the pressure of the intake air.

13. An apparatus for diagnosing performance of an intake air amount detection device of an internal combustion engine comprising:

a stable operation region determination means for determining an operation region in which an internal combustion engine equipped with an intake air amount detection device stably operates;

a throttle valve opening degree detecting means for detecting the opening degree of a throttle valve interposed in an intake system of the engine;

a means for calculating a change amount of the opening degree of the throttle valve when the opening degree of the throttle valve has changed in said determined stable operation region;

a means for calculating an intake air change amount detected by said intake air amount detection device when the opening degree of said throttle valve has changed; and a diagnosing means for diagnosing performance of the intake air amount detection device based upon a relationship between the change amount of the opening degree of said throttle valve and the intake air change amount.

14. An apparatus for diagnosing performance of an intake air amount detection device of an internal combustion engine according to claim 13, wherein said stable operation region determination means includes the warmed-up state of the engine and the state where no misfiring is occurring as conditions of the stable operation region.

15. An apparatus for diagnosing performance of an intake air amount detection device of an internal combustion engine according to claim 13, wherein said stable operation region determination means includes the partial-throttle output state of the engine as a condition of the stable operation region.

16. An apparatus for diagnosing performance of an intake air amount detection device of an internal combustion engine according to claim 13, further comprising an air density detecting means for detecting the density of the atmosphere, wherein said means for calculating an intake air change amount calculates an intake air change amount by being corrected by the air density detected by said air density detecting means.

17. An apparatus for diagnosing performance of an intake air amount detection device of an internal combustion engine according to claim 13, wherein said intake air amount detection device is an air flow meter for detecting the intake air amount.

18. An apparatus for diagnosing performance of an intake air amount detection device of an internal combustion engine according to claim 13, wherein said intake air amount detection device is a pressure sensor for detecting the pressure of the intake air.

19. An apparatus for diagnosing performance of an intake air amount detection device of an internal combustion engine comprising:

a predetermined operation region determination means for determining a plurality of predetermined operation regions of the internal combustion engine equipped with an intake air amount detection device;

a deviation calculation means for calculating deviations among the respective intake air amounts detected by said intake air amount detection device in said plurality of predetermined operation regions; and a diagnosing means for diagnosing performance of the intake air amount detection device by comparing said calculated deviations with a reference value.

20. An apparatus for diagnosing performance of an intake air amount detection device of an internal combustion engine according to claim 19, wherein said intake air amount detection device is an air flow meter for detecting the intake air amount.

21. An apparatus for diagnosing performance of an intake air amount detection device of an internal combustion engine according to claim 19, wherein said intake air amount detection device is a pressure sensor for detecting the pressure of the intake air.

* * * * *